Sept. 27, 1932.  C. F. BIFFAR  1,880,170
ANTISKID CHAIN
Filed June 6, 1931
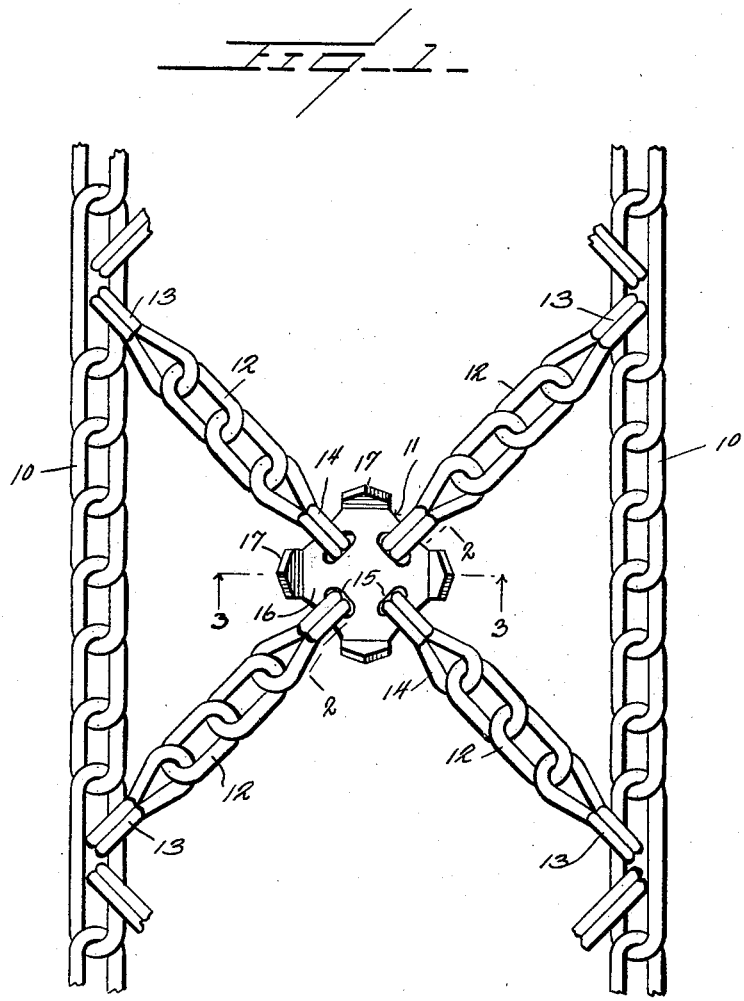
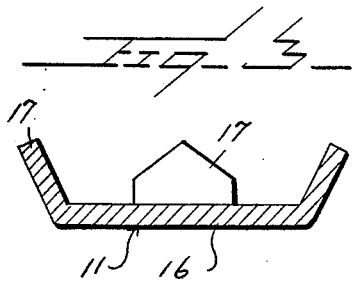
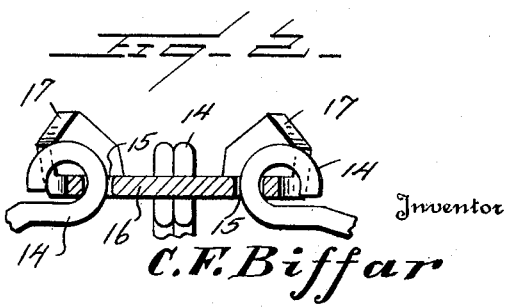
Inventor
C. F. Biffar
By Watson E. Coleman
Attorney Patented Sept. 27, 1932

1,880,170

UNITED STATES PATENT OFFICE

CHARLES F. BIFFAR, OF LONG EDDY, NEW YORK

ANTISKID CHAIN

Application filed June 6, 1931. Serial No. 542,639.

This invention relates to skid chains, and more particularly to an improved anti-skid device which is adapted to engage the tread of the tire.

An object of this invention is to provide anti-skid means which may be connected to a chain construction and which is disposed on the tread of the tire so as to be engaged with the ground or roadway at all times during the rotation of the wheel.

Another object of this invention is to provide an anti-skid member of this kind which can be readily and cheaply manufactured and which will not only facilitate traction of the tire, but will also prevent side slipping in either direction of the tire.

A still further object of this invention is to provide an anti-skid member of this kind which is connected to the side chains in such a manner as to prevent both circumferential and lateral movement of the plate with respect to the side chains.

The above and various other objects and advantages of this invention will in part be described in and in part be understood from the following detailed description of the present preferred embodiment, the same being illustrated in the accompanying drawing, wherein:—

Figure 1 is a detail top plan view of a device constructed according to the preferred embodiment of this invention, mounted on a pair of side chains;

Figure 2 is an enlarged fragmentary sectional view partly in detail taken on the line 2—2 of Figure 1, and Figure 3 is an enlarged sectional view taken on the line 3—3 of Figure 1, of the anti-skid member removed from the chains.

Referring to the drawing wherein like numerals of reference designate corresponding parts throughout the several views, the numeral 10 designates generally a pair of side chains of conventional construction, and the numeral 11 designates generally an anti-skid member which is adapted to be disposed over the tread of the tire, this anti-skid member 11 being connected to the side chains 10 by means of crossed chain sections 12. These crossed chain sections 12 have a hook member 13 at the outer ends thereof which is disposed in a link of the side chains 10, and these cross chain sections 12 also have inner hook members 14 which are disposed in openings 15 provided in the body of the anti-skid member 11.

The anti-skid member 11 comprises a body plate 16 of substantially rectangular configuration which is provided with tines or prongs 17 at each corner thereof, which prongs 17 are disposed in upwardly and outwardly divergent relation, these prongs 17 being relatively pointed or tapering in construction, so as to provide a relatively sharp prong for engagement with the roadway or ice so as to prevent lateral or circumferential slipping of the tire. Preferably, two opposing prongs are disposed in opposed relation or laterally from the first pair, so as to prevent side slipping of the tire. In this manner, the tire is prevented from slipping circumferentially and laterally in either direction.

Through the provision of these cross chain sections 12 being positioned in crossed relation to each other, the anti-skid member 11 is held at all times in a fixed position on the periphery of the tire and at the central point of the tread, so that it will engage the ground at all times.

In the use of this device, when the side chains 10 are tightened in any desired manner, the tightening of these side chains 10 will dispose the anti-skid member 11 at the center of the tread of the tire, which position will be maintained during the rotation of the wheel.

It is, of course, understood that various changes and modifications may be made in the details of construction and design of the above specifically described embodiment of this invention without departing from the spirit thereof, such changes and modifications being restricted only by the scope of the following claim.

I claim:—

An anti-skid member of the character described adapted to be connected to the cross chains of an anti-skid chain comprising a base plate of substantially rectangular configuration adapted to be positioned on the center of the tread of a tire, said plate having the corners thereof upturned in outwardly divergent relation, the plate also having a plurality of elongated openings on each side thereof intermediate the corners to receive the cross chains, said upturned corners preventing skidding of the tire while holding the cross chains out of engagement with the ground to prevent wear of the connection between the cross chain and the base plate.

In testimony whereof I hereunto affix my signature.

CHARLES F. BIFFAR.